United States Patent [19]
Mumford

[11] 4,067,434
[45] Jan. 10, 1978

[54] LEHR LOADER

[75] Inventor: Eustace H. Mumford, Ottawa Lake, Mich.

[73] Assignee: Owens-Illinois, Inc., Toledo, Ohio

[21] Appl. No.: 685,855

[22] Filed: May 13, 1976

[51] Int. Cl.² .......................................... B65G 47/32
[52] U.S. Cl. ................................. 198/427; 198/430; 198/740
[58] Field of Search ............... 198/426, 427, 429, 430, 198/436, 487, 610, 740, 836

[56] References Cited

U.S. PATENT DOCUMENTS

| | | | |
|---|---|---|---|
| 1,983,593 | 12/1934 | Beeson et al. | 198/430 |
| 2,203,385 | 6/1940 | Figel | 198/430 |
| 2,547,791 | 4/1951 | Smith et al. | 198/430 |
| 3,040,867 | 6/1962 | Posten et al. | 198/430 |
| 3,184,031 | 5/1965 | Dunlap | 198/430 |
| 3,687,262 | 8/1972 | Campbell et al. | 198/430 |
| 3,724,639 | 4/1973 | Hara | 198/430 |
| 3,776,342 | 12/1973 | Kulig et al. | 198/430 |
| 3,853,213 | 12/1974 | Lehman et al. | 198/429 |

FOREIGN PATENT DOCUMENTS

| | | | |
|---|---|---|---|
| 147,387 | 10/1951 | Australia | 198/429 |

Primary Examiner—Evon C. Blunk
Assistant Examiner—Richard K. Thomson
Attorney, Agent, or Firm—D. T. Innis

[57] ABSTRACT

Apparatus for pushing a row of glass containers from a cross-conveyor onto a lehr mat in which containers being pushed have their finish portions stabilized by both a forward and rearward positioned angle iron movable with the pushing member and mounted to the pusher mechanism that reciprocates during operation.

A cam member contacts the rear portion of the spring-biased stabilizing member-mounting arms causing the bar to stop moving rearwardly as the pushing member is retracted so that the stabilizing member does not enter or cross the path of the next row of containers.

3 Claims, 5 Drawing Figures

LEHR LOADER

BACKGROUND OF THE INVENTION

Lehr loaders or stackers, as they are sometimes termed, basically transfer a row of bottles moving at right angles to the movement of the lehr mat from the conveyor carrying the bottles by pushing the bottles from the conveyor onto the lehr mat. The motions of the bottle conveyors and the loader operation are synchronized for coordinated operation. In most glass forming operations, particularly of the individual section-type machines that are being used, the glassware is formed in the forming machine and then transferred to an annealing lehr for removing or relieving objectionable internal stresses and strains that are set up in the articles upon cooling of the article. If these stresses and strains are allowed to remain, the resulting articles are objectionably brittle and subject to excessive breakage during use. Where articles are produced in large quantities, it is most desirable, for efficient operation, that article handling be performed mechanically and preferably this means that the ware should be smoothly and automatically handled from the time that the ware is set out, from the forming machine onto a machine conveyor, to when the ware is transferred to a cross-conveyor. The cross-conveyor moves across the width of the lehr at the front end thereof and it is from this cross-conveyor that the lehr loader or stacker moves the newly formed ware into the lehr.

In the operation of present lehr loaders, there is the possibility that when the ware is fairly tall, with relatively small diameter bases, that the ware may tip as it is being transferred from the cross-conveyor to the moving lehr mat or belt.

It has been proposed to use a neck or finish stabilizing bar that is carried by the main pusher bar and to have this stabilizing bar pivoted to the pusher bar mounting so that it can be raised and lowered in time with the forward movement of the pusher bar.

One serious problem with such an arrangement, is that the stabilizing bar usually must be set so far ahead of the pusher bar that it loses its effectiveness and bottles will tip during transfer or if set too close will pivot down on to the top of the finish of the ware if the ware is pushed ahead of its normal line. This may occur when a serrated pusher bar is used. Further, the stabilizer could fall on the finish of some of the ware if the line of containers formed on the cross-conveyor were not accurately set in the proper line or not always in perfect alignment.

As previously stated, the ware is moved by a pusher bar engaging the sides of the ware at a point fairly close to the bottom of the ware. As the ware is moved from the cross-conveyor, it must move over a dead plate which extends between the side of the cross-conveyor and the lehr mat. Such an arrangement is generally shown in U.S. Pat. No. 2,547,791 dated Apr. 3, 1951.

SUMMARY OF THE INVENTION

An apparatus for pushing or transferring a row of newly formed glass containers from the side of the moving cross-conveyor onto the forward end of a moving lehr belt or mat where a pusher bar engages the row of containers usually at or below the center of mass of the containers and pushes the entire row simultaneously from the conveyor over an intervening dead plate onto the lehr mat, then moves upwardly over the incoming, next row on the conveyor and retracts back to a starting position which is behind the moving row of containers on the conveyor, the improvement in this system comprising a stabilizing member mounted ahead of the pusher bar movable relative thereto, and also slightly ahead of the finish of the row of containers on the conveyor for preventing forward tipping of the containers while being pushed onto the lehr mat. The stabilizing member never retracts very much behind the edge of the cross-conveyor facing the dead plate but moves with the pusher bar when the bar engages the containers. A second stabilizing member is mounted above the pusher bar, moves with the pusher bar and is positioned at the finish height of the containers and prevents rearward tipping of the containers while being pushed by the bar.

DETAILED DESCRIPTION OF THE DRAWINGS

Figure 1:
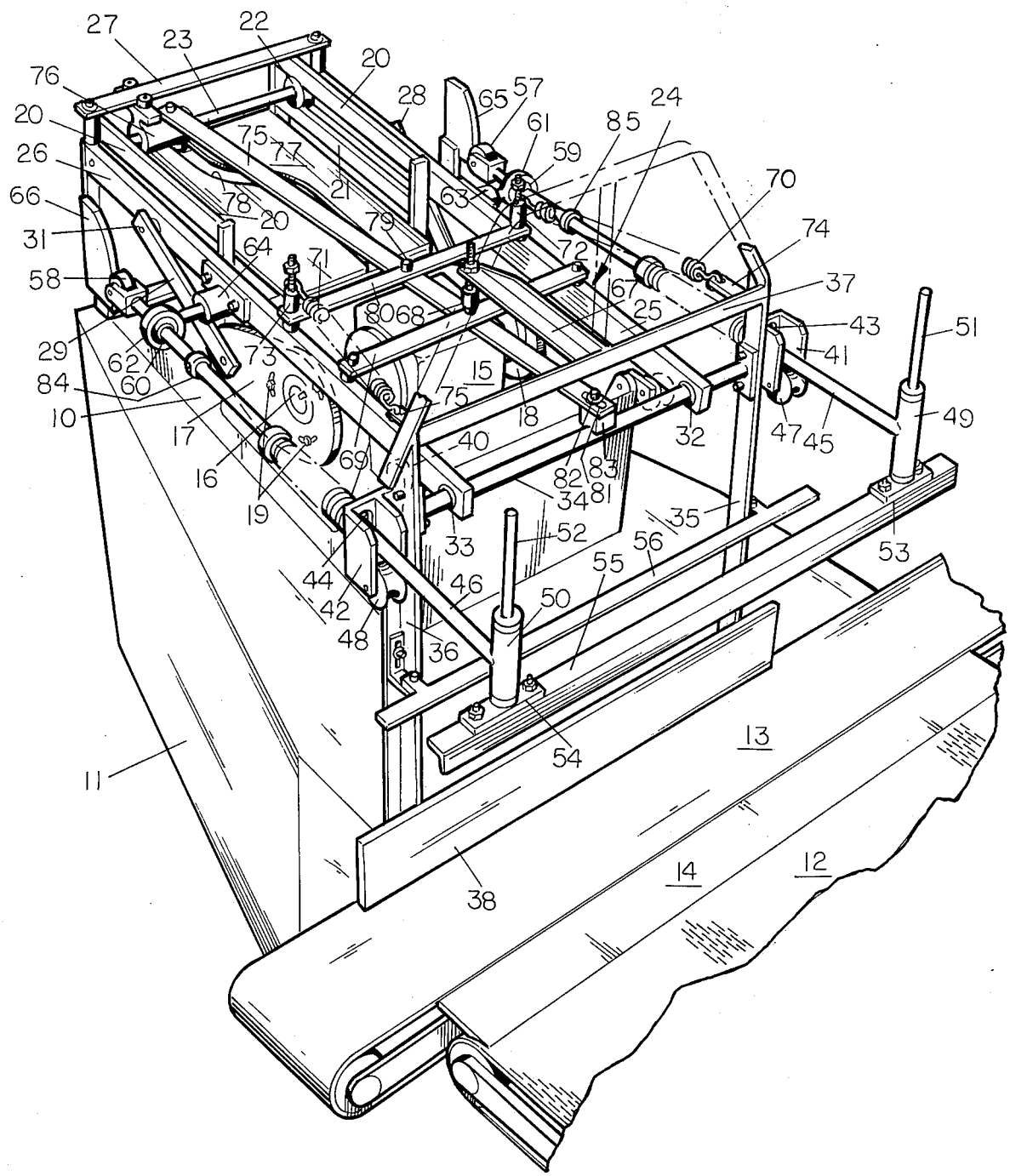
FIG. 1 is a perspective view of the lehr loader of the invention.

With particular reference to FIG. 1, the apparatus of the invention will be described, it being understood that FIGS. 2, 3 and 4 will be referred to when describing the various stages of operation of movement of the apparatus as shown in FIG. 1.

Generally, a fixed base casting 10 mounted on a floor supported member 11 is positioned opposite the entrance end of a lehr (not shown) whose mat is shown at 12 in FIG. 1, it being understood that the mat 12 extends from the area shown in FIG. 1 through the full length of the annealing lehr. Between the lehr mat 12 and the base 10, a cross-conveyor 13 is moving in the direction of the arrow shown thereon. Between the side of the cross-conveyor 13 and the lehr mat 12 is a dead plate 14 over which the ware is pushed, it being understood that the plate 14 merely fills the gap between the cross-conveyor 13 and the lehr mat 12.

A synchronous drive motor contained within the support 11, operating in synchronism with the cross-conveyor 13, operates through a gear box 15. The gear box 15 carries a pair of output shafts 16. The shafts 16, only one of which is visible, it being understood there is a second extending to the right, as viewed in FIG. 1, from the gear box 15, are connected to a cam plate 17. A similar cam plate 18 is connected to the other shaft 16. The cam plates 17 and 18 are identical in shape and are identically positioned on the shafts 16. Some adjustment of the shafts 16 and the position of the cam plates is possible; however, for simplicity, such adjustment is only schematically shown on FIG. 1 by bolts 19.

The fixed base casting 10, adjacent the rearward end thereof, supports pairs of vertically spaced-apart rails 20 and 21. The gap between the rails 20 and 21 serves as a guide for a pair of rollers 22. The rollers 22 are connected together by a horizontally extending shaft 23. The end of the shaft 23 extends through the roller 22 and is bearing in the rearward portion of a horizontally reciprocated frame 24 formed by two side rails 25 and 26 whose rearward ends are tied together by a cross member 27, as well as the shaft 23. One of a pair of connecting rods 28 and 29 is pivotally connected at one end to the cam plate 17 at 30, and at the opposite end pivotally connected to the side rail 26 to 31.

It will readily be appreciated that rotation of the shaft 16 and the cam plates 17 and 18 will result in the connecting rods 28 and 29 being moved through a circular path about the axis of shaft 16 resulting in a reciprocating motion being conveyed to the side rails 25 and 26. The forward ends of the side rails 25 and 26 are provided with journals 32 and 33 through which a horizontal shaft 34 extends. The opposite ends of the shaft 34 are fixed to a pair of horizontally spaced-apart angle members 35 and 36. The angle members 35 and 36 are tied together by a horizontal brace 37. The lower ends of the members 35 and 36 carry a pusher bar 38 adapted to engage the sides of the bottles and push them from the conveyor 13. The forward ends of the side rails 25 and 26 are supported by a pair of rollers 39 and 40. The angle members 35 and 36 on the outside thereof supporting the position of the connection of the shaft 34 thereto, are provided with a pair of roller support members 41 and 42.

As can be seen in FIG. 1, the members 41 and 42 are provided with elongated, vertically extending openings 43 and 44, respectively, through which shafts 45 and 46 extend. The members 41 and 42 are each provided with and support rollers 47 and 48. The rollers carry the weight of the shafts 45 and 46 and permit relative movement between the shafts and the angle members 35 and 36. The forward extending ends of the shafts 45 and 46 are connected to vertically extending sleeves 49 and 50. The sleeves 49 and 50 adjustably receive vertical rods 51 and 52. The lower ends of the rods 51 and 52 are fixed to cross-members 53 and 54 which in turn support an elongated angle, finish-steadying, member 55. Ware-steadying member 55, as can best be seen in FIG. 1, is generally co-extensive in length with the pusher bar 38 and in operation will be positioned substantially at the elevation shown in FIG. 2.

Figure 2:
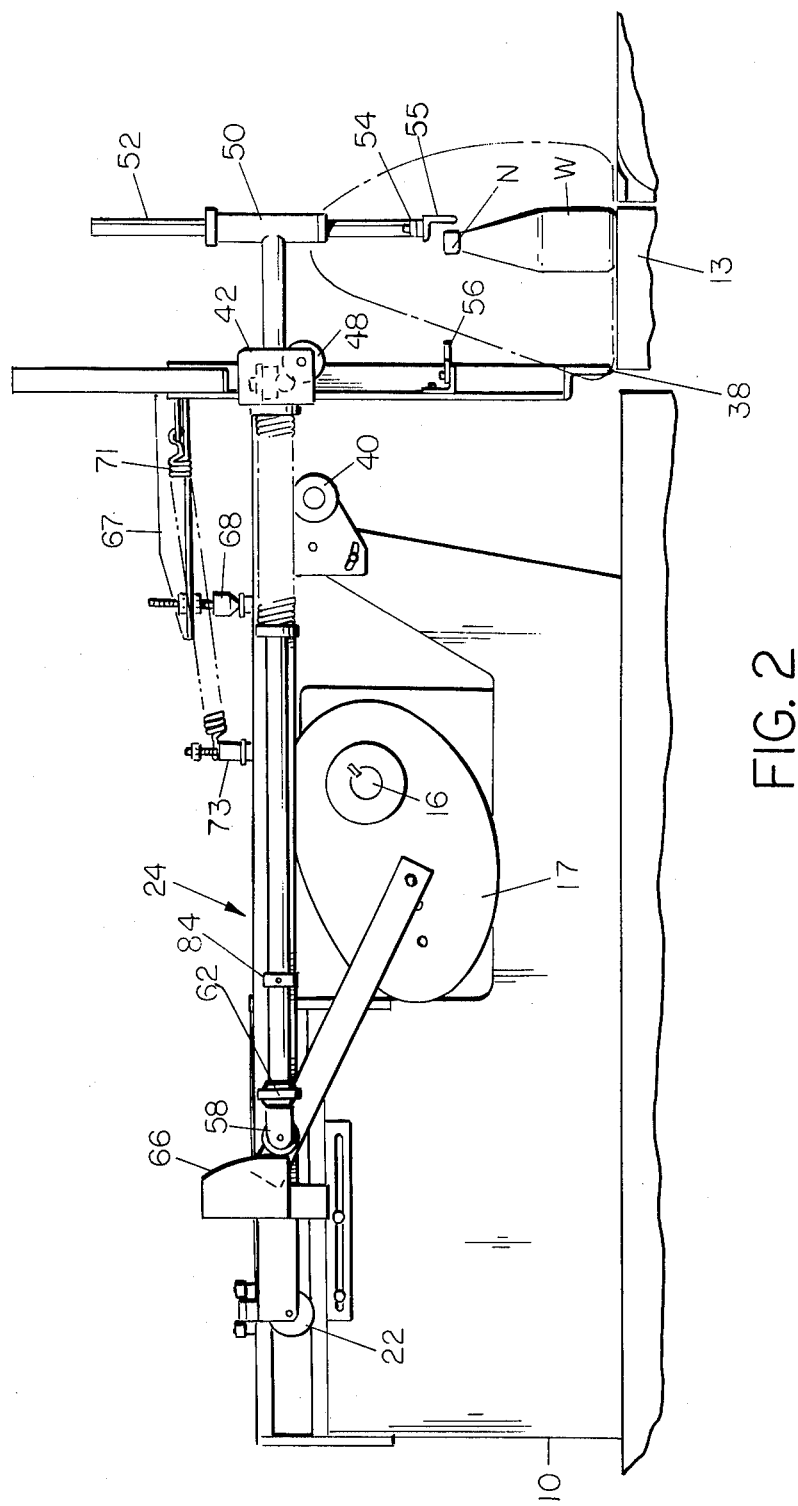
FIG. 2 is a side elevational view of the apparatus of FIG. 1.

As can be seen from FIG. 2, ware W moving on the conveyor 13 will have its finish or neck portion N slightly to the left of the steadying member 55.

Figure 3:
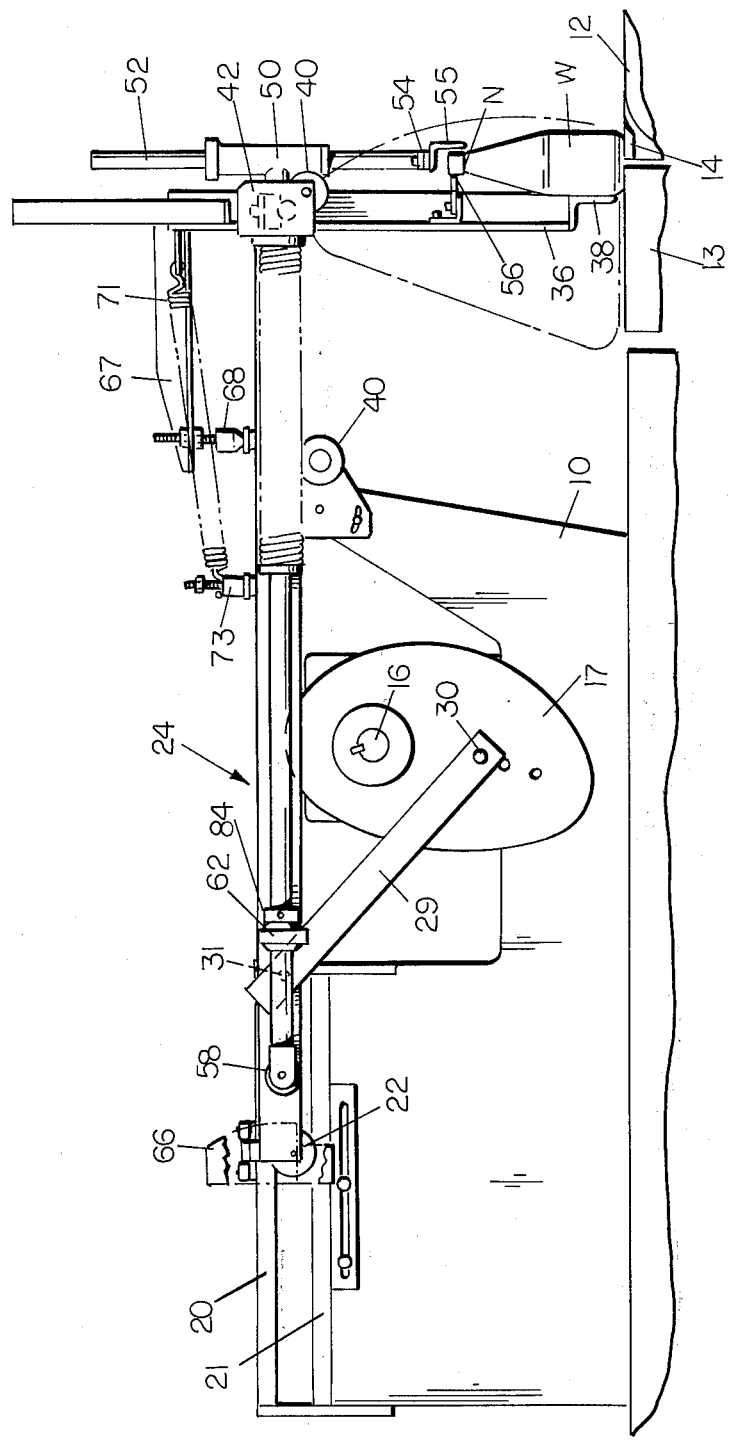
FIG. 3 is a view similar to FIG. 2 showing the pusher mechanism pushing the ware from the cross-conveyor onto the dead plate.
Figure 4:
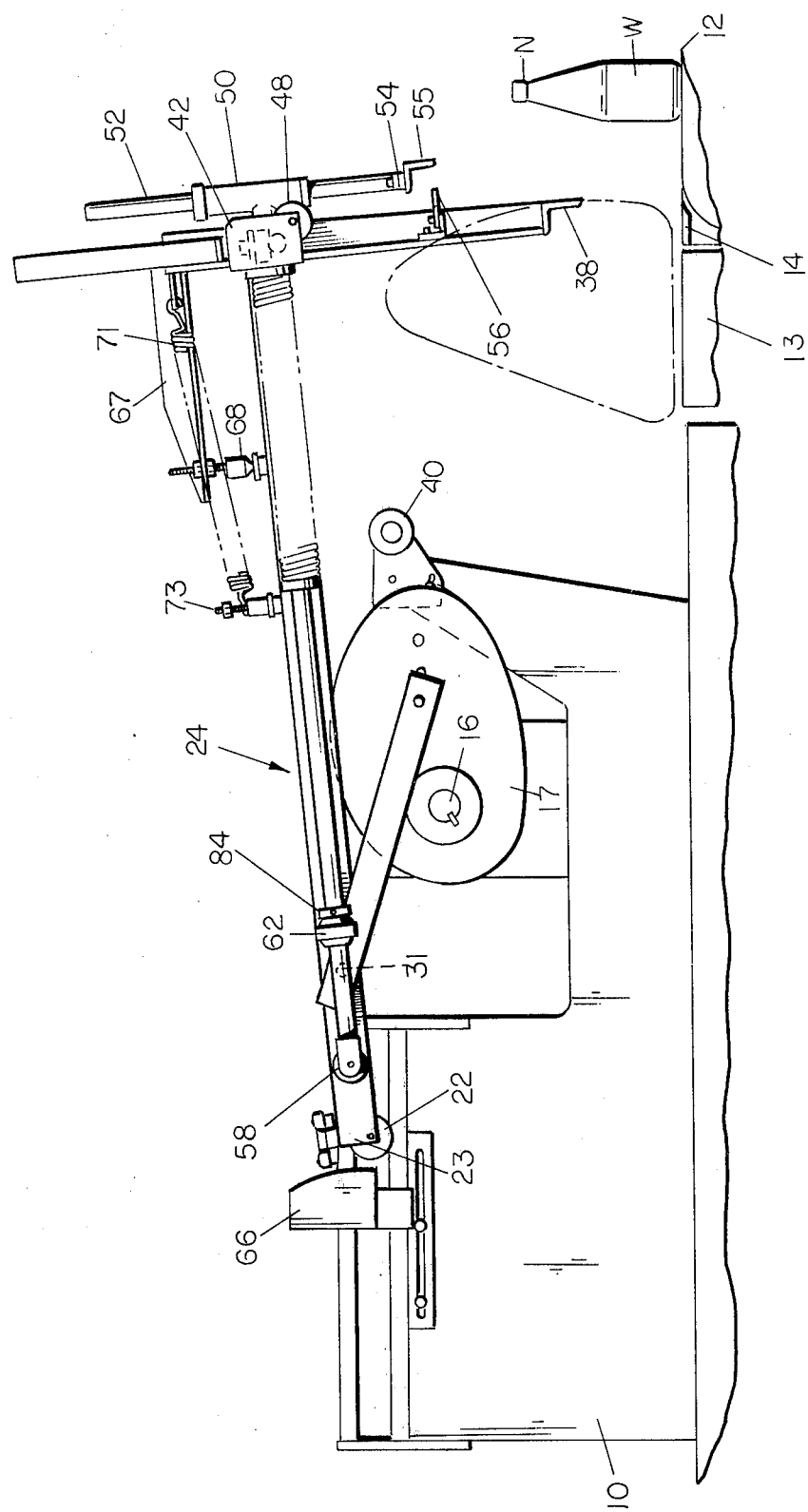
FIG. 4 is a view similar to FIG. 2 in its fully advanced position and beginning its upward travel.

It can be seen that a second ware-steadying member 56 is connected to and mounted on the angle members 35 and 36 at the approximate height of the finish or neck of the ware so that as the ware is moved, for example as shown in FIG. 3, the neck is prevented from moving or tipping forward by the steadying member 55 and prevented from tipping backward by the steadying member 56. The ends of the shafts 45 and 46 opposite the end-carrying sleeves 49 and 50 are provided with the cam follower rollers 57 and 58. Just in advance of the rollers 57 and 58, the shafts 45 and 46 extend through sleeve bearings 59 and 60, with the bearings themselves supported in universal ball members 61 and 62. It should be understood that the outer races of the ball members 61 and 62 are fixed to the side of the frame side rails 25 and 26, respectively, by threaded shafts engaging threaded sockets 63 and 64.

It should be noted that the member 55 and its support sleeves 50 and 49 are carried at the forward end of the shafts 45 and 46 and that these shafts carry stop members 84 and 85 which are adjustable as to their position along the shafts. The stop members are engaged by the ball joint members 61 and 62 as the frame 24 moves forward, so that as the pusher member 38 engages the sidewall of the ware and has begun to move the ware to the right over the dead plate 14, the member 55 will be moving with the pusher bar 38.

In the operation of the apparatus, as can perhaps best be seen when viewing FIG. 2, when the frame 24 is retracted to its furthest position to the left, the cam followers 57 and 58 will engage cams 65 and 66. The position of the cams 65 and 66 determines the stop point or closest position of the steadying member 55 to the base 10. Obviously, if the member 55 were permitted to retract with the frame 24, to a greater extent than that shown in FIG. 2, the incoming ware W would either hit member 55 or be positioned on the wrong side thereof.

In the event the pusher bar 38 were to become jammed or prevented from moving to position the ware onto the lehr mat 12, a safety system is provided to avoid breaking any of the drive mechanisms. This safety feature is provided by the fact that the pusher bar 38 and its supporting angle members 35 and 36 are capable of rotating about the axis of the shaft 34. They are in a position, as shown in FIG. 1, which is determined by the engagement of a rearwardly extending brace 67 which is connected at its forward end to the cross-brace 37 and at its inwardly extending end carries a vertically adjustable roller 68 which engages a cross-bar 69 which extends across and is connected to the side rails 25 and 26.

A pair of tension springs 70 and 71 extend from anchoring posts 72 and 73 to tabs 74 and 75. The tabs 74 and 75 are fixed to the rear of the cross-braces 37 and as can readily be seen, will bias the pusher bar 38 and its supporting frame into the position where the roller 68 will engage the cross-bar 69. In the event the main frame 24 continues forward with the bar 38 jammed, the springs will permit the bar 38 to remain in its shown position with the frame pivoting and the roller carrying brace 67 will pivot upwardly. Once the pusher bar 38 is free of interference, the springs will then return the bar to the position where the roller 68 is in engagement with the cross-bar 69.

One other feature is shown which is an arrangement for laterally shifting the pusher bar support in the direction of movement of the conveyor 13 during the forward movement of the pusher bar such that the bar itself tends to follow the movement of the ware on the conveyor 13 at the point of contacting the ware, then moves straight forward moving the ware across the dead plate onto the conveyor 13. This bar moving arrangement is the result of a horizontal bar 75. The bar 75 extends from a cam follower member 76, to which one end of the bar 75 is pivotally connected. A cam plate 77, having a cam track 78 formed therein, and in which the follower is positioned, will cause the follower 76 to move from left to right, as viewed in FIG. 1, as the frame 24 moves forward. The bar 75 is pivoted at approximately its mid-length to a pin 79 carried by a cross-member 80 which in turn has its ends fixed to the side rails 25 and 26. The forward end of the bar 75 is provided with a horizontal slot 81 through which a guide bolt 82 extends. The guide bolt 82 is threaded into a block 83, with the block 83 being fixed to the shaft 34. Thus it can be seen that as the frame 24 moves forward, the bar 75, pivoted at 79, will shift the pusher bar 38 in the direction of movement of the conveyor 13 as the cam follower 76 follows the cam track 78. This movement is desirable from the point of view that additional ware coming onto the conveyor 13, will not be interfered with by the forward movement of the pusher bar 38 and also the transition from lateral movement of the ware on the conveyor 13 to the direction of movement of the lehr mat 12 is not as severe and aids in avoiding tipping the ware during transfer.

In actual practice, what it amounts to is that the ware is not moved at an absolute right angle to the direction of its movement on the conveyor 13, but is moved from the conveyor 13 with the combined sideways and forward motion relative to the direction of the movement of the conveyor 13.

Figure 5:
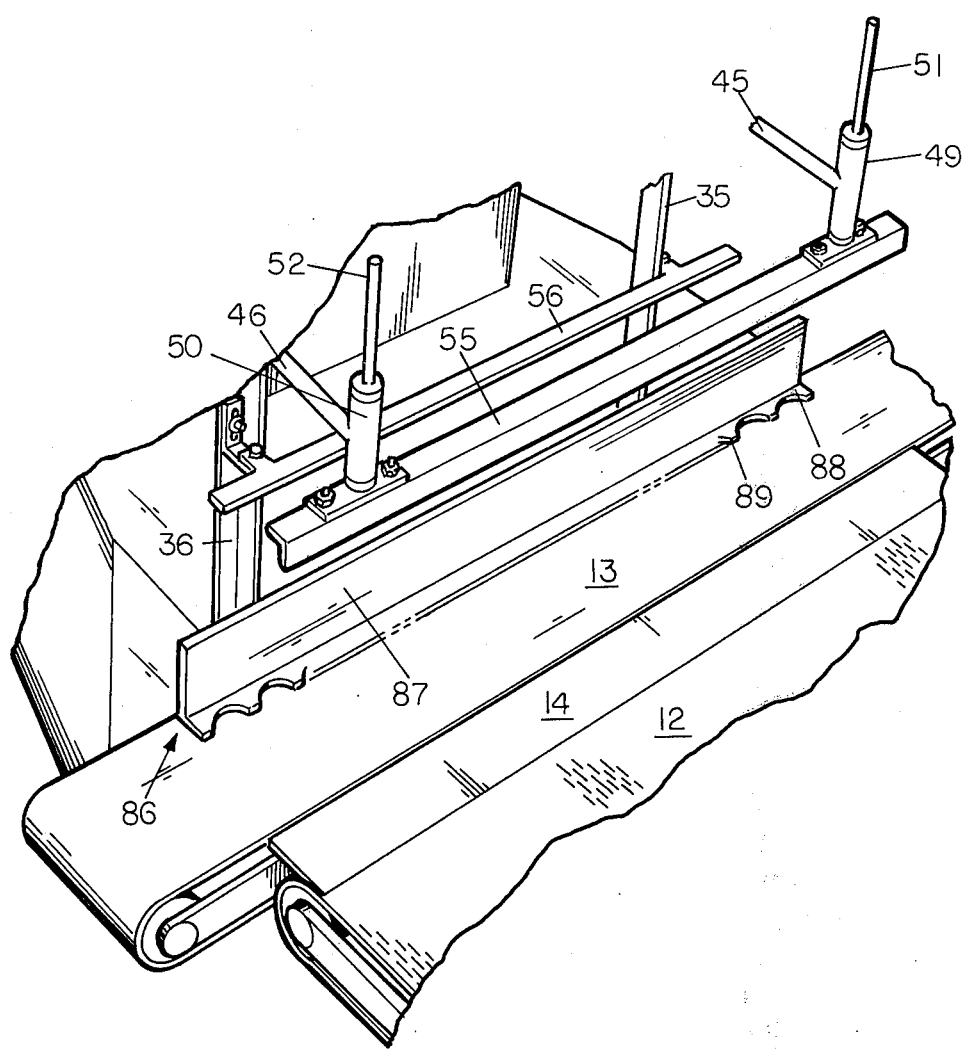
FIG. 5 is a partial perspective view similar to FIG. 1, showing a modification of the pusher bar to which the present invention has particular adaptability.

With particular reference to FIG. 5, there is shown a second embodiment of the lehr loader mechanism in which the pusher bar generally designated 86 has a generally serrated bottle-engaging portion 88 extending horizontally outward from a vertical portion 87. The vertical portion 87 is essentially similar to the pusher bar 38 of FIG. 1. It should be kept in mind that the bar 86 of FIG. 5 is operated mechanically, substantially identically to the bar 38 of FIG. 1.

The bar 86 is of particularly advantageous design and while shown as having a serrated ware-engaging portion 88, it should be understood that this bar could also be made with a saw-tooth configuration or also could be made with a plurality of forward extending, horizontal pegs. The reason for these generally serrated or ware-separating configurations is so that the ware will be placed on the lehr mat with fairly even spaces between the ware resulting in columns of ware in the lehr that are evenly spaced. This is both desirable and necessary when the ware is to be subjected to a surface treatment in the lehr or while the ware is carried by the lehr mat. Nearly all machine produced glass containers are presently provided with a lubricious coating at the "cold end" of the lehr. In order for the treatment to be effective, it is necessary that the ware be spaced from each other so that spray or vaporizing equipment can effectively apply the treatment to all sides of the ware.

The stabilizing member 55 of the present invention is especially useful when the pusher bar is of the "ware spacing" type 88 as shown in FIG. 5. When the ware is engaged by a "ware spacer" pusher bar 86, it may begin to move the ware by the high spots 89 of the serration and unless the stabilizing member 55 is in close position with the container, it may tip forward before it moves into the pocket of the bar 86. The stabilizing member 55 of the present invention will be positioned at the line of the finishes of the ware and will move with the pusher when the pusher has arrived at a particular position. The important thing is that with the present invention the neck or finish stabilizing member will never be lowered onto the ware but will always be in front of and at the proper height (once set up for ware configuration) during the operation of the lehr loader.

While the ware spacing loader bar of FIG. 5 is of a particular configuration, it should be pointed out that this bar can take a number of configurations, as suggested above, namely saw-tooth or outstanding pegs being just two examples.

I claim:

1. In apparatus for pushing a row of glassware from a transversely moving cross-conveyor onto the forward end of a lehr mat wherein a pusher bar is brought into contact with the ware at or below its center of mass and pushes the ware from the transversely moving conveyor over a dead plate onto the lehr mat and shifts upward and over the next developing row of ware on said conveyor and then down to a position behind the row of ware, the improvement comprising:

a stabilizing bar positioned slightly in advance of the finishes of the row of ware for preventing the forward tipping of the ware while being pushed laterally from the conveyor onto the lehr mat;

a pair of horizontal shafts, said stabilizing bar being mounted to the forward end of said horizontal shafts;

cam means mounted on the pusher bar support;

a roller on the rearward ends of said shafts;

means biasing said rollers into contact with said cams when the pusher bar is in its retracted position; and means on said pusher bar moving apparatus for drivingly engaging stop means on said shafts after forward movement of said pusher bar of a preselected extent, whereby said stabilizing bar and pusher bar move together during movement of the ware from the conveyor onto the lehr mat.

2. The apparatus of claim 1 further including means for horizontally adjusting said cam means whereby said stabilizing bar has its initial position adjustably determined by said cam means.

3. The apparatus of claim 1, wherein said stop means on said shafts are adjustable, axially of said shaft.

* * * * *